(12) United States Patent
Dong et al.

(10) Patent No.: US 12,078,472 B1
(45) Date of Patent: Sep. 3, 2024

(54) INTERFEROMETRIC DISPLACEMENT MEASUREMENT SYSTEM AND METHOD BASED ON PHASE MODULATION OF POLARIZED LIGHT OF MICRO PROBE

(71) Applicant: Harbin Institute of Technology, Harbin (CN)

(72) Inventors: Yisi Dong, Harbin (CN); Chen Zhang, Harbin (CN); Pengcheng Hu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 18/395,571

(22) Filed: Dec. 24, 2023

(30) Foreign Application Priority Data

Aug. 2, 2023 (CN) .......................... 202310968540.8

(51) Int. Cl.
*G01B 11/14* (2006.01)
*G01B 9/02001* (2022.01)
(52) U.S. Cl.
CPC .......... *G01B 11/14* (2013.01); *G01B 9/02001* (2013.01)
(58) Field of Classification Search
None
See application file for complete search history.

(56) References Cited

U.S. PATENT DOCUMENTS

| 4,422,764 A | * | 12/1983 | Eastman | G01B 11/303 356/512 |
| 5,305,330 A | * | 4/1994 | Rieder | H01S 5/0687 372/32 |
| 5,349,440 A | * | 9/1994 | DeGroot | G01B 9/02027 356/489 |

(Continued)

FOREIGN PATENT DOCUMENTS

| CN | 201191235 Y | * | 2/2009 |
| CN | 102636109 A | * | 8/2012 |

OTHER PUBLICATIONS

CNIPA, Notification of a First Office Action for CN202310968540.8, Feb. 8, 2024.

(Continued)

*Primary Examiner* — Edmond C Lau
*Assistant Examiner* — Jarreas Underwood
(74) *Attorney, Agent, or Firm* — Zhigang Ma

(57) ABSTRACT

An interferometric displacement measurement system and method based on phase modulation of polarized light of micro probe are provided. An electro-optic phase modulator is used to perform sinusoidal phase modulation on a light beam emitted by a semiconductor laser to obtain an adjusted light beam. The adjusted light beam is divided by a polarization beam splitter to generate a reference light beam and a measurement light beam. The two light beams are respectively reflected by a built-in reflection surface of a micro probe and a target mirror, and transmitted to a polarization-maintaining fiber circulator. The reference light beam inter- (Continued)

feres with the measurement light beam at a fiber optic polarization element to generate an interference light signal. A photodetector converts the interference light signal into an interference electrical signal, and the interference electrical signal is demodulated by a signal demodulator to obtain a displacement value of the target mirror.

9 Claims, 1 Drawing Sheet

(56) References Cited

U.S. PATENT DOCUMENTS

| | | | |
|---|---|---|---|
| 10,386,171 B1* | 8/2019 | Perea | G01B 9/02041 |
| 2021/0199418 A1* | 7/2021 | Yan | G01B 9/02027 |

OTHER PUBLICATIONS

Harbin Institute of Technology (Applicant), Reply to Notification of a First Office Action for CN202310968540.8, w/ replacement claims, Mar. 11, 2024.

Harbin Institute of Technology (Applicant), Supplemental Reply to Notification of a First Office Action for CN202310968540.8, w/ (allowed) replacement claims, Mar. 14, 2024.

CNIPA, Notification to grant patent right for invention in CN202310968540.8, Mar. 29, 2024.

* cited by examiner

INTERFEROMETRIC DISPLACEMENT MEASUREMENT SYSTEM AND METHOD BASED ON PHASE MODULATION OF POLARIZED LIGHT OF MICRO PROBE

TECHNICAL FIELD

The disclosure relates to the technical field of laser measurement, and particularly to an interferometric displacement measurement system and method based on phase modulation of polarized light of micro probe.

BACKGROUND

With the rapid development and wide application of aerospace, high-precision instrumentation, inertial navigation platforms, optics, and laser technology, the demand for ultra-precision machining of various high-precision complex parts, optical parts, high-precision planes, curved surfaces, and complex shapes has become increasingly urgent, and new technologies and instruments of ultra-precision measurement in ultra-precision machining have appeared. The ultra-precision measurement has great technical difficulty and high technical intensity, and it shows the development characteristics of a large measurement range and embedded measurement. As an indispensable technology and core means in the field of ultra-precision displacement measurement, the optical fiber interferometric displacement measurement is also developing towards the characteristics of a large measurement range, small size, being easy to be embedded into the equipment for high-accuracy measurement. Compared with traditional laser interferometers, fiber-optic micro probe laser interferometers have the advantages of tiny probe size, easy tuning, and embedded measurement, which meet the urgent needs of ultra-precision machining, high-end equipment integration, measurement and testing, and other fields for large measurement ranges and high-accuracy embedded displacement measurements in narrow spaces.

In traditional interferometric measurement methods based on phase modulation of laser, two methods are usually used: electro-optic phase modulator and internal frequency modulation based on light source to achieve phase modulation of the interference light signal. The electro-optic phase modulator cannot achieve miniaturization of the measurement optical path due to the need to add the electro-optic phase modulator to a reference arm. Therefore, the phase modulation of a micro probe fiber optic interferometer is usually achieved through internal frequency modulation of semiconductor light source. The light source modulation method requires the stability of the center frequency under a wide range of frequency tuning, which complicates a light source control system and introduces accompanied optical intensity modulation errors; and a modulation depth is related to a distance of a measured target. When the distance of the measured target changes significantly, the modulation depth will deviate from an optimal working point, resulting in the inability to demodulate the interference light signal. Therefore, the frequency modulation method of light source will limit the displacement measurement range and extension of multi-axis measurement, these problems restrict the implementation of large measurement range and high-accuracy displacement measurement in the micro probe laser interferometer.

SUMMARY

In order to achieve a purpose of solving the above technical solutions, the disclosure provides an interferometric displacement measurement system and method based on phase modulation of polarized light of micro probe. To achieve the above purpose, the disclosure uses the following technical solutions.

An interferometric displacement measurement system based on phase modulation of polarized light of micro probe is provided. The interferometric displacement measurement system includes a semiconductor laser, an electro-optic phase modulator, a polarization-maintaining fiber circulator, a polarization beam splitter, a fiber optic polarization element, a photodetector, a target mirror, a polarization-maintaining fiber optic jumper, and a signal demodulator. The semiconductor laser is connected to the electro-optic phase modulator through the polarization-maintaining fiber optic jumper. The semiconductor laser is configured to emit a polarized light beam, the polarization-maintaining fiber optic jumper is configured to adjust the polarized light beam to obtain an adjusted light beam; the adjusted light beam is configured to transmit to the electro-optic phase modulator along a y-axis direction, and an angle between a polarization direction of the adjusted light beam and a z-axis direction is 45 degrees. The electro-optic phase modulator is configured to process the adjusted light beam to obtain a first light component on an x-axis direction and a second light component on the z-axis direction. The polarization-maintaining fiber circulator includes a first port, a second port, and a third port. The first port is connected to the electro-optic phase modulator, the second port is connected to the polarization beam splitter, and the third port is connected to the fiber optic polarization element. The polarization-maintaining fiber circulator is configured to transmit the adjusted light beam to the polarization beam splitter through the second port; and the polarization beam splitter is configured to generate a measurement light beam based on the first light component and a reference light beam based on the second light component. The polarization beam splitter is specifically configured to reflect the second light component by a built-in reflection surface to obtain the reference light beam, and transmit the reference light beam to the second port of the polarization-maintaining fiber circulator. The polarization-maintaining fiber circulator is configured to transmit the reference light beam to the fiber optic polarization element through the third port. The polarization beam splitter is specifically configured to make the first light component undergo a transmission phenomenon of light to obtain the measurement light beam (also referred to as a transmission light beam for measuring a displacement value). The measurement light beam is configured to transmit to the target mirror. The target mirror is configured to reflect the measurement light beam and transmit the measurement light beam to the second port of the polarization-maintaining fiber circulator through the polarization beam splitter. The polarization-maintaining fiber circulator is configured to transmit the measurement light beam to the fiber optic polarization element through the third port. The fiber optic polarization element is configured to process the measurement light beam and the reference light beam to output an interference light signal to the photodetector. The photodetector is configured to convert the interference light signal into an interference electrical signal and transmit the interference electrical signal to the signal demodulator; and the signal demodulator is configured to demodulate and process the interference electrical signal to obtain a displacement value of the target mirror.

In some embodiments, the interferometric displacement measurement system further includes a driver. The driver is connected to the electro-optic phase modulator and the signal demodulator. The driver is configured to generate a first sinusoidal voltage signal loaded to the electro-optic phase modulator as a driving voltage signal with phase modulation, and to generate a second sinusoidal voltage signal loaded to the signal demodulator as a reference signal.

In some embodiments, the signal demodulator includes a demodulator, an error corrector, and an arctangent operator. The demodulator is connected to the driver. The demodulator is configured to receive the reference signal, mix the interference light signal with the reference signal to obtain a first mixed signal, perform low-pass filtering processing on the first mixed signal to obtain a first quadrature signal, mix the interference light signal with the reference signal having a double frequency to obtain a second mixed signal, and perform low-pass filtering processing on the second mixed signal to obtain a second quadrature signal. The error corrector is configured to eliminate errors of the first quadrature signal and the second quadrature signal. The arctangent operator is configured to perform an arctangent operation on a result of dividing the first quadrature signal by the second quadrature signal, obtain a phase difference containing the displacement value of the target mirror, and calculate the displacement value of the target mirror.

In some embodiments, a relationship between the displacement value of the target mirror and the phase difference is expressed as:

$$\Delta L = \lambda/4\pi n \Delta \varphi_s$$

where $\Delta L$ represents the displacement value of the target mirror, $\Delta \varphi_s$ represents the phase difference corresponding to the displacement value, $\lambda$ represents a laser wavelength, and n represents a refractivity of air.

In some embodiments, the driving voltage signal is expressed as:

$$V = V_0 \cos w_c t$$

where V represents the driving voltage signal, $V_0$ represents an amplitude of the driving voltage signal, t represents time, and $w_c$ represents a frequency of the driving voltage signal.

An orthogonal polarization component of the first light component and an orthogonal polarization component of the second light component modulated by the electro-optic phase modulator are expressed as:

$$\varphi_{z(e)} = \frac{2\pi}{\lambda} n_e D_{eo} - \frac{\pi}{\lambda} n_e^3 \gamma_e D_{eo} \frac{V}{d}$$

$$\varphi_{x(o)} = \frac{2\pi}{\lambda} n_o D_{eo} - \frac{\pi}{\lambda} n_o^3 \gamma_o D_{eo} \frac{V}{d}$$

where $\varphi_{x(o)}$ represents the orthogonal polarization component of the first light component, $\varphi_{z(e)}$ represents the orthogonal polarization component of the second light component, $n_e$ represents a refractivity of an extraordinary light (e-light) component under natural birefringence of a crystal, $n_o$ represents a refractivity of an ordinary light (o-light) component under the natural birefringence of the crystal, $D_{eo}$ represents a length of the crystal along an optical axis, d represents a height of the crystal along a direction of an electric field, $\gamma_e$ and $\gamma_o$ represent an electro-optical coefficient of e-light and an electro-optical coefficient of o-light respectively, and $\lambda$ represents a laser wavelength.

In some embodiments, an angle between a connector key of the polarization-maintaining fiber jumper and a slow axis of polarization-maintaining fiber is 45 degrees.

In some embodiment, the interferometric displacement measurement system further includes a gradient index collimating lens disposed at an input end of the polarization beam splitter.

In some embodiments, the electro-optical phase modulator, the polarization-maintaining fiber circulator, the gradient index collimating lens, the polarization beam splitter, the fiber polarization element, and the photodetector are connected to each other through polarization-maintaining fibers.

In some embodiment, the gradient index collimating lens and the polarization beam splitter form a micro probe configured for displacement interferometric sensing.

An interferometric displacement measurement method based on phase modulation of polarized light of micro probe is provided, and the interferometric displacement measurement method is applied to the interferometric displacement measurement system based on phase modulation of polarized light of micro probe mentioned above. The interferometric displacement measurement method includes:

generating, by the driver, sinusoidal voltage signals; and transmitting, by the driver, the sinusoidal voltage signals to the electro-optic phase modulator and the signal demodulator, respectively;

outputting, by the semiconductor laser, the polarized light beam to the electro-optic phase modulator through the polarization-maintaining fiber optic jumper; and processing the polarized light beam by the electro-optic phase modulator to generate the adjusted light beam having the first light component and the second light component;

transmitting, by the polarization-maintaining fiber circulator, the first light component and the second light component to the polarization beam splitter to obtain the measurement light beam and the reference light beam; wherein the reference light beam is obtained through reflecting the adjusted light beam by a built-in reflection surface of the polarization beam splitter, and the measurement light beam is obtained through reflecting the adjusted light beam by the target mirror;

transmitting, by the polarization beam splitter, the measurement light beam and the reference light beam to the third port of the polarization-maintaining fiber circulator; transmitting, by the polarization-maintaining fiber circulator, the reference light beam and the measurement light beam to the fiber optic polarization element; processing, by the fiber optic polarization element, the measurement light beam and the reference light beam to generate the interference light signal; and receiving the interference light signal by the photodetector; and processing, by the photodetector, the interference light signal to generate the interference electrical signal; processing, by the signal demodulator, the interference electrical signal to obtain a phase difference; and obtaining, by the signal demodulator, the displacement value of the target mirror based on a linear relationship between the phase difference and a displacement value of the target mirror.

The disclosure has beneficial effects as follows.

(1) The disclosure modulates the orthogonal polarized reference light beam and measurement light beam by incorporating the electro-optic phase modulator in the fiber optic optical path, thereby ensuring the miniaturization of the measurement optical path while avoiding the accompanied optical intensity modulation error caused by internal modulation of the light source frequency, and also reducing the difficulty of frequency stabilization of the light source.

(2) The disclosure uses the electro-optic phase modulator to complete phase modulation of the interference light signal. The optimal modulation depth is related to the amplitude of the driving voltage signal and parameters of the electro-optic phase modulator, and is independent of a distance of the target mirror. Therefore, the extended applications of displacement measurement range and multi-axis measurement are not limited by the modulation depth.

(3) The optical path structure of the disclosure is simple, and the displacement sensing of the target mirror is achieved while the micro probe is connected to an interferometer host machine through a single optical fiber. The disclosure has high flexibility and integration, and can be embedded in delicate equipment or used for large-range and high-accuracy displacement measurement in narrow spaces.

DESCRIPTION OF REFERENCE NUMERALS

1—semiconductor laser; 2—electro-optic phase modulator; 3—polarization-maintaining fiber circulator; 4—gradient index collimating lens; 5—polarization beam splitter; 6—fiber optic polarization element; 7—photodetector; 8—target mirror; 9—displacement device; 10—polarization-maintaining fiber jumper; 11—signal demodulator; 12—upper computer; 13—driver; 31—demodulator; 32—error corrector; 33—arctangent operator.

DETAILED DESCRIPTION OF EMBODIMENTS

The technical solutions in embodiments of the disclosure will be clearly and completely described below with reference to FIG. 1 to FIG. 3 in the embodiments of the disclosure. Apparently, the described embodiments are only a part of the embodiments, but not all of them. Unless otherwise specified, the technical means used in the embodiments are conventional means well known to those skilled in the art.

Compared with traditional laser interferometers, fiber-optic micro probe laser interferometers have the advantages of extremely small probe size, easy tuning and embedded measurement, which meet the urgent needs of ultra-precision machining, high-end equipment integration, measurement and testing and other fields for large measurement ranges and high-accuracy embedded displacement measurements in narrow spaces. Therefore, the fiber-optic micro probe laser interferometers are widely researched and applied. To ensure the miniaturization of the measurement optical path, existing micro probe interference measurement systems usually use internal modulation of the light source frequency to perform phase sinusoidal modulation on interference optical signal. This modulation method requires to maintain the stability of a center frequency under large frequency tuning, which increases the complexity and instability of the light source frequency stabilization. At the same time, the frequency tuning of the light source also leads to changes in power, resulting in accompanied optical intensity modulation errors, and there is also a problem of the displacement measurement range being limited by an optimal phase modulation depth, which limits the further development of interference displacement measurement systems based on micro probes.

Figure 1:
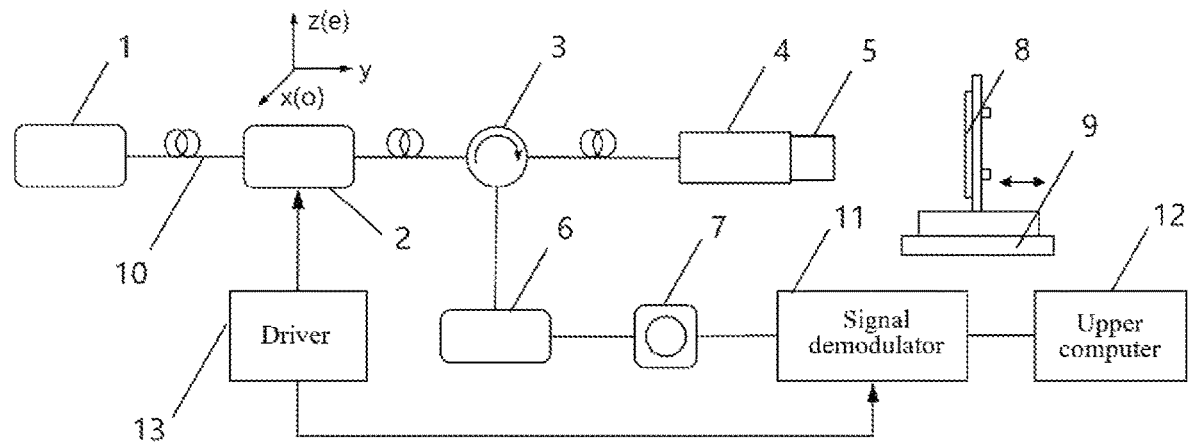
FIG. 1 illustrates a structural schematic diagram of an interferometric displacement measurement system based on phase modulation of polarized light of micro probe provided by the disclosure.
Figure 2:
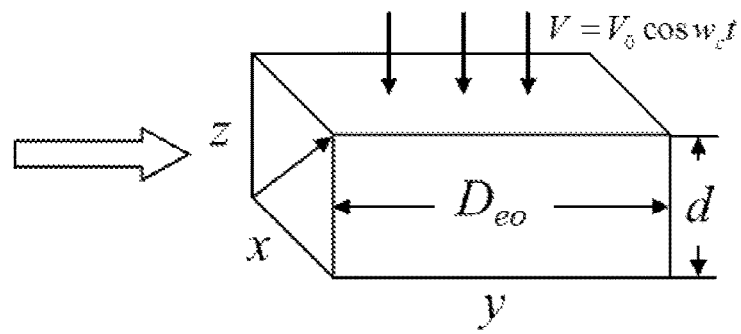
FIG. 2 illustrates a schematic diagram of a working principle of an electro-optic phase modulator of the disclosure.

In addition, the disclosure constrains directions of three spatial coordinate systems, namely an x-axis direction, a y-axis direction, and a y-axis direction as shown in FIG. 1 and FIG. 2, where the y-axis direction is a parallel direction of the laser emitted by a semiconductor laser 1, the z-axis direction is a direction of e-light, and the x-axis direction is a direction of o-light.

Referring to FIG. 1, an interferometric displacement measurement system based on phase modulation of polarized light of micro probe is provided. The interferometric displacement measurement system includes a semiconductor laser 1, an electro-optic phase modulator 2, a polarization-maintaining fiber circulator 3, a polarization beam splitter 5, a fiber optic polarization element 6, a photodetector 7, a target mirror 8, a polarization-maintaining fiber optic jumper 10, and a signal demodulator 11. The semiconductor laser 1 is connected to the electro-optic phase modulator 2 through the polarization-maintaining fiber optic jumper 10. The polarization-maintaining fiber optic jumper 10 is configured to maintain a polarization state of a polarized light beam emitted by the semiconductor laser 1 to obtain an adjusted light beam. The adjusted light beam is transmitted to the electro-optic phase modulator 2 along the y-axis direction, and an angle between a polarization direction of the adjusted light beam and the z-axis direction is 45 degrees. The electro-optic phase modulator 2 is configured to process the adjusted light beam to generate a first light component on the x-axis direction and a second light component on the z-axis direction.

The polarization-maintaining fiber circulator 3 includes a first port, a second port, and a third port. The first port is connected to the electro-optic phase modulator 2. The second port is connected to the polarization beam splitter 5, and the third port is connected to the fiber optic polarization element 6. The first light component and the second light component are configured to transmit to the polarization beam splitter 5 through the second port. The first light component and the second light component pass through the polarization beam splitter 5 to generate a measurement light beam and a reference light beam. The reference light beam is a reflected light beam of the polarization beam splitter 5. After the reference light beam is reflected by a built-in reflection surface of the polarization beam splitter 5, the reference light beam is transmitted to the second port of the polarization-maintaining fiber circulator 3, and the reference light beam is transmitted to the fiber optic polarization element 6 through the third port. The measurement light beam is a transmission light of the polarization beam splitter 5 obtained by processing the first light component. After the measurement light beam is transmitted to target mirror 8 and is reflected to the polarization beam splitter 5, the measurement light beam is transmitted to the second port of the polarization-maintaining fiber circulator 3, and the measurement light beam is transmitted to the fiber optic polarization element 6 through the third port. The fiber optic polarization element 6 is configured to processes the measurement light beam and the reference light beam to output an interference light signal to the photodetector 7, and the photodetector 7 is configured to convert the interference light signal into an interference electrical signal and transmit the interference electrical signal to the signal demodulator 11. The signal demodulator 11 is configured to demodulate and process the interference electrical signal to obtain a displacement value of the target mirror 8.

Specifically, the semiconductor laser 1 outputs a linearly polarized light beam (i.e., the polarized light beam emitted by the semiconductor laser 1) with a vibration direction parallel to a slow axis of a polarization-maintaining fiber through a tail fiber of the polarization-maintaining fiber. A polarization direction of the linearly polarized light beam is adjusted by the polarization-maintaining fiber optic jumper 10 to obtain an adjusted light beam, making the adjusted light beam be transmitted to the electro-optic phase modulator 2 along a y-axis direction of an electro-optical crystal. An angle between a polarization direction of the adjusted light beam and a z-axis direction is 45 degrees. The adjusted light beam enters the crystal and be decomposed into two light components (i.e., the first light component and the second light component) in the x-axis direction and the z-axis direction. The two light components undergo different phase shifts due to the crystal birefringence effect and the electro-optic effect. The two light components are transmitted from the first port of the polarization-maintaining fiber circulator 3 to the second port, and the two light components are transmitted from the second port to gradient index collimating lens 4, and the two light components are collimated by the gradient index collimating lens 4. Then the two light components are converted into two light beams (also referred to as the reference light beam and the measurement light beam) through reflection and transmission of the polarization beam splitter 5.

The reflected light beam of the polarization beam splitter 5 is taken as the reference light beam. After the reference light beam is reflected by the built-in reflection surface of the polarization beam splitter 5, the reference light beam is transmitted to the second port of the polarization-maintaining fiber circulator 3, and the reference light beam is transmitted to the fiber optic polarization element 6 through the third port. The transmission light beam of the polarization beam splitter 5 is taken as the measurement light beam. After the measurement light beam is transmitted to target mirror 8 to acquire displacement information of the target mirror 8, the measurement light beam containing the displacement information of the target mirror 8 is reflected to the polarization beam splitter 5, then the measurement light beam is transmitted to the second port of the polarization-maintaining fiber circulator 3, and the measurement light beam is transmitted to the fiber optic polarization element 6 through the third port. The measurement light beam interferes with the reference light beam at the fiber optic polarization element 6, thereby obtaining the interference light signal. The interference light signal is transmitted to the photodetector 7, and the photodetector 7 converts the interference light signal into the interference electrical signal. The interference electrical signal is transmitted to the signal demodulator 11, the signal demodulator 11 demodulates and processes the interference electrical signal to obtain the displacement value of the target mirror 8, and an upper computer 12 is configured to display the displacement value in real-time.

A method of using the polarization-maintaining fiber optic jumper 10 to adjust the polarization state of the polarized light beam includes: adjusting an angle between the connector of the polarization-maintaining fiber optic jumper 10 and a slow axis of a polarization-maintaining fiber to 45 degrees, and connecting the connector to an output tail fiber of the semiconductor laser 1. In some embodiment, the polarization-maintaining fiber jumper 10 can be replaced with a fiber Faraday rotator to rotate the polarization direction of the polarized light beam emitted by the semiconductor laser 1 by 45 degrees.

Furthermore, the interferometric displacement measurement system further includes a driver 13. The driver 13 is connected to the electro-optic phase modulator 2 and the signal demodulator 11. The driver 13 is connected to the electro-optic phase modulator 2 and the signal demodulator 11, and the driver 13 is configured to generate a first sinusoidal voltage signal loaded to the electro-optic phase modulator 2 as a driving voltage signal with phase modulation, and to generate a second sinusoidal voltage signal loaded to the signal demodulator 11 as a reference signal. Moreover, parameters of the first sinusoidal voltage signal are consistent with parameters of the second sinusoidal voltage signal, in other words, a sinusoidal voltage signal is loaded to the electro-optic phase modulator 2 and the signal demodulator 11 in two paths.

Specifically, the first sinusoidal voltage signal is configured as the driving voltage signal with phase modulation of the electro-optic phase modulator 2, and the second sinusoidal voltage signal is configured as the reference signal of the signal demodulator 11. The driving voltage signal is used to perform sinusoidal phase modulation on the adjusted light beam. The reference signal is used to participate in the demodulation of the displacement information of the target mirror 8.

Specifically, the signal demodulator 11 includes a demodulator 31, an error corrector 32, and an arctangent operator 33.

Figure 3:
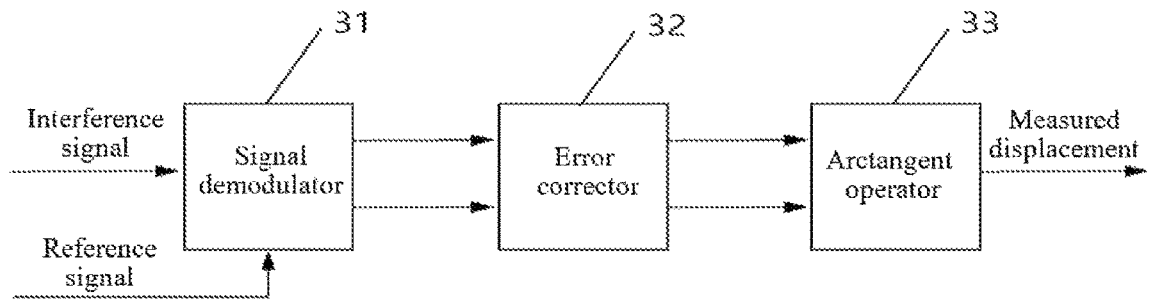
FIG. 3 illustrates a structural schematic diagram of a signal demodulator of the disclosure.

Referring to FIG. 3, the second sinusoidal voltage signal generated by the driver 13 is transmitted to the signal demodulator 11, and the second sinusoidal voltage signal is taken as the reference signal in the signal demodulator 11 to demodulate the interference light signal. The demodulator 31 performs frequency doubling on the reference signal input by the driver 13. The demodulator 31 is configured to receive the reference signal, mix the interference light signal with the reference signal to obtain a first mixed signal, perform low-pass filtering processing on the first mixed signal to obtain a first quadrature signal, mix the interference light signal with the reference signal having a double frequency to obtain a second mixed signal, and perform low-pass filtering processing on the second mixed signal to obtain a second quadrature signal. Ideally, the first quadrature signal and the second quadrature signal are fully orthogonal signals without direct current (DC) bias, and the first quadrature signal and the second quadrature signal have equal amplitudes. Actually, due to factors such as optical path and circuit delay, environmental noise, etc., the two quadrature signals obtained by demodulator 31 are not fully orthogonal. The error corrector 32 of the signal demodulator 11 is configured to eliminate the DC bias, alternating current (AC) with unequal amplitudes, and non-orthogonal errors of the two filtered orthogonal signals, thereby obtaining optimized two orthogonal signals. Finally, a result of dividing the first quadrature signal by the second quadrature signal is input into the arctangent operator 33 for arctangent operation, to obtain a phase difference containing the displacement information of the target mirror 8. Then, a displacement value of the target mirror 8 is calculated based on a relationship between the change in the phase difference and the displacement value.

FIG. 2 illustrates a schematic diagram of a working principle of the electro-optic phase modulator 2 of the disclosure. Referring to FIG. 2, the driving voltage signal is applied in the z-axis direction of the electro-optical crystal. The driving voltage signal is expressed as: $V=V_0 \cos w_c^t$, V represents the driving voltage signal, $V_0$ represents an amplitude of the driving voltage signal, t represents time, and $w_c$ represents a frequency of the driving voltage signal. The light beam is transmitted in the y-axis direction of the electro-optical crystal, and an angle between a polarization direction of the light beam and the z-axis direction of the electro-optical crystal is 45 degrees. The light beam passes through electro-optical crystal to generate the first light component and the second light component. An orthogonal polarization component of the first light component and an orthogonal polarization component of the second light component modulated by the electro-optic phase modulator 2 are expressed as:

$$\varphi_{z(e)} = \frac{2\pi}{\lambda}n_e D_{eo} - \frac{\pi}{\lambda}n_e^3 \gamma_e D_{eo} \frac{V}{d}$$

$$\varphi_{x(o)} = \frac{2\pi}{\lambda}n_o D_{eo} - \frac{\pi}{\lambda}n_o^3 \gamma_o D_{eo} \frac{V}{d}$$

where $\varphi_{x(o)}$ represents the orthogonal polarization component of the first light component, $\varphi_{z(e)}$ represents the orthogonal polarization component of the second light component, $n_e$ represents a refractivity of an e-light component under natural birefringence of a crystal, $n_o$ represents a refractivity of an o-light component under the natural birefringence of the crystal, $D_{eo}$ represents a length of the crystal along an optical axis, d represents a height of the crystal along a direction of an electric field, $\gamma_e$ and $\gamma_o$ represent an electro-optical coefficient of e-light and an electro-optical coefficient of o-light respectively, and $\lambda$ represents a laser wavelength.

Furthermore, the interferometric displacement measurement system further includes a gradient index collimating lens 4 disposed at an input end of the polarization beam splitter 5. The gradient index collimating lens 4 and the polarization beam splitter 5 form a micro probe configured for displacement interferometric sensing.

In some embodiments, the micro probe can be directly used as a detection end of the disclosure, the target mirror 8 can be an object to be measured, and the target mirror 8 is moved by the displacement device 9. Both the target mirror 8 and the displacement device 9 are existing technical devices.

Furthermore, the electro-optical phase modulator 2, the polarization-maintaining fiber circulator 3, the gradient index collimating lens 4, the polarization beam splitter 5, the fiber polarization element 6, and the photodetector 7 are connected to each other through polarization-maintaining fibers. Unless otherwise specified, a connection joint of the polarization-maintaining fiber is aligned with the slow axis of the polarization-maintaining fiber. The polarization-maintaining fiber circulator 3 is a dual axis working polarization-maintaining fiber circulator, and the fiber polarization element 6 is selected from a group consisting of a fiber polarizer, a fiber detector, and a polarization-maintaining fiber jumper.

An interferometric displacement measurement method based on phase modulation of polarized light of micro probe is provided, and the interferometric displacement measurement method is applied to the interferometric displacement measurement system based on phase modulation of polarized light of micro probe. The interferometric displacement measurement method includes:

generating a first sinusoidal voltage signal and a second sinusoidal voltage signal by the driver 13, and transmitting the first sinusoidal voltage signal and the second sinusoidal voltage signal to the electro-optic phase modulator 2 and the signal demodulator 11;

outputting the polarized light beam by the semiconductor laser 1, processing the polarized light beam by the polarization-maintaining fiber optic jumper 10 and the electro-optic phase modulator 2 to generate the first light component and the second light component;

processing the first light component and the second light component by the polarization-maintaining fiber circulator 3 and the polarization beam splitter 5 to generate the measurement light beam and the reference light beam;

reflecting the reference light beam by the built-in reflection surface of the polarization beam splitter 5 to transmit the reference light beam to the third port of the polarization-maintaining fiber circulator 3, reflecting the measurement light beam by the target mirror 8 to the third port of the polarization-maintaining fiber circulator 3, transmitting the reference light beam and the measurement light beam from the third port of the polarization-maintaining fiber circulator 3 to the fiber optic polarization element 6, processing the measurement light beam and the reference light beam by the fiber optic polarization element 6 to generate the interference light signal, receiving the interference light signal by the photodetector 7; and processing the interference light signal by the photodetector 7 to generate the interference electrical signal, processing the interference electrical signal by the signal demodulator 11 to obtain a phase difference, obtaining a displacement value of the target mirror 8 based on a linear relationship between the phase difference and the displacement value of the target mirror 8.

The measurement light beam interferes with the reference light beam at the fiber optic polarization element 6, thereby obtaining the interference light signal. The optimal modulation depth of the interference light signal is related to the amplitude of the driving voltage signal and parameters of the electro-optic phase modulator 2, and is independent of a distance of the target mirror 8. Therefore, the displacement measurement range is not limited by the modulation depth.

Specifically, a relationship between the displacement value of the target mirror 8 and the phase difference is expressed as:

$$\Delta L = \lambda/4\pi n \Delta\varphi_s$$

where $\Delta L$ represents the displacement value of the target mirror 8, $\Delta\varphi_s$ represents the phase difference corresponding to the displacement value, and $\lambda$ represents a laser wavelength, and n represents a refractivity of air.

Compared with existing interferometric displacement measurement technology based on phase modulation of micro probe, the interferometric displacement measurement system and method based on phase modulation of polarized light of micro probe provided by the disclosure have the following advantages.

1. The disclosure modulates the orthogonal polarized reference light beam and measurement light beam by incorporating the electro-optic phase modulator 2 in the fiber optic optical path, thereby ensuring the miniaturization of the measurement optical path while avoiding the accompanied optical intensity modulation error caused by internal modulation of the light source frequency, and also reducing the difficulty of frequency stabilization of the light source.

2. The disclosure uses the electro-optic phase modulator 2 to complete phase modulation of the interference light signal. The modulation depth is related to the amplitude of the driving voltage signal and parameters of the electro-optic phase modulator 2, and is independent of a distance of the target mirror 8. Therefore, a large displacement of the target mirror 8 will not cause the phase modulation depth to deviate from the optimal working point, and the extended applications of displacement measurement range and multi-axis measurement are not limited by the modulation depth.

3. The optical path structure of the disclosure is simple, and the displacement sensing of the target mirror is achieved while the micro probe is connected to an interferometer host machine through a single optical fiber. The disclosure has high flexibility and integration, and can be embedded in delicate equipment or used for large-range and high-accuracy displacement measurement in narrow spaces.

The above embodiments are only some embodiments of the disclosure and do not limit the scope of the disclosure. On the premise of not deviating from the design spirit of the disclosure, all kinds of changes, modifications, replacements, and substitutions made by those skilled in the art to the technical solutions of the disclosure should fall within the scope of protection defined in the claims.

What is claimed is:

1. An interferometric displacement measurement system based on phase modulation of polarized light of micro probe, comprising: a semiconductor laser (1), an electro-optic phase modulator (2), a polarization-maintaining fiber circulator (3), a polarization beam splitter (5), a fiber optic polarization element (6), a photodetector (7), a target mirror (8), a polarization-maintaining fiber optic jumper (10), and a signal demodulator (11);

wherein the semiconductor laser (1) is connected to the electro-optic phase modulator (2) through the polarization-maintaining fiber optic jumper (10); the semiconductor laser (1) is configured to emit a polarized light beam; the polarization-maintaining fiber optic jumper (10) is configured to adjust the polarized light beam to obtain an adjusted light beam; the adjusted light beam is configured to transmit to the electro-optic phase modulator (2) along a y-axis direction, and an angle between a polarization direction of the adjusted light beam and a z-axis direction is 45 degrees; and the electro-optic phase modulator (2) is configured to process the adjusted light beam to obtain a first light component on an x-axis direction and a second light component on the z-axis direction;

wherein the polarization-maintaining fiber circulator (3) comprises: a first port, a second port, and a third port; the first port is connected to the electro-optic phase modulator (2), the second port is connected to the polarization beam splitter (5), and the third port is connected to the fiber optic polarization element (6); the polarization-maintaining fiber circulator (3) is configured to transmit the adjusted light beam to the polarization beam splitter (5) through the second port; and the polarization beam splitter (5) is configured to generate a measurement light beam based on the first light component and a reference light beam based on the second light component;

wherein the polarization beam splitter (5) is specifically configured to reflect the second light component by a built-in reflection surface to obtain the reference light beam, and transmit the reference light beam to the second port of the polarization-maintaining fiber circulator (3); and the polarization-maintaining fiber circulator (3) is configured to transmit the reference light beam to the fiber optic polarization element (6) through the third port;

wherein the polarization beam splitter (5) is specifically configured to make the first light component undergo a transmission phenomenon of light to obtain the measurement light beam, and the measurement light beam is configured to transmit to the target mirror (8); the target mirror (8) is configured to reflect the measurement light beam and transmit the measurement light beam to the second port of the polarization-maintaining fiber circulator (3) through the polarization beam splitter (5); and the polarization-maintaining fiber circulator (3) is configured to transmit the measurement light beam to the fiber optic polarization element (6) through the third port;

wherein the fiber optic polarization element (6) is configured to process the measurement light beam and the reference light beam to output an interference light signal to the photodetector (7); the photodetector (7) is configured to convert the interference light signal into an interference electrical signal and transmit the interference electrical signal to the signal demodulator (11); and the signal demodulator (11) is configured to demodulate and process the interference electrical signal to obtain a displacement value of the target mirror (8); and wherein the interferometric displacement measurement system further comprises a driver (13); the driver (13) is connected to the electro-optic phase modulator (2) and the signal demodulator (11), and the driver (13) is configured to generate a first sinusoidal voltage signal loaded to the electro-optic phase modulator (2) as a driving voltage signal with phase modulation, and to generate a second sinusoidal voltage signal loaded to the signal demodulator (11) as a reference signal.

2. The interferometric displacement measurement system based on phase modulation of polarized light of micro probe as claimed in claim 1, wherein the signal demodulator (11) comprises: a demodulator (31), an error corrector (32), and an arctangent operator (33);

the demodulator (31) is connected to the driver (13); and the demodulator (31) is configured to receive the reference signal, mix the interference light signal with the reference signal to obtain a first mixed signal, perform low-pass filtering processing on the first mixed signal to obtain a first quadrature signal, mix the interference light signal with a double frequency signal of the reference signal to obtain a second mixed signal, and perform low-pass filtering processing on the second mixed signal to obtain a second quadrature signal;

the error corrector (32) is configured to eliminate errors of the first quadrature signal and the second quadrature signal; and the arctangent operator (33) is configured to perform an arctangent operation on a result of dividing the first quadrature signal by the second quadrature signal, obtain a phase difference containing the displacement value of the target mirror (8), and calculate the displacement value of the target mirror (8).

3. The interferometric displacement measurement system based on phase modulation of polarized light of micro probe as claimed in claim 2, wherein a relationship between the displacement value of the target mirror (8) and the phase difference is expressed as:

$$\Delta L = \lambda/4\pi n \Delta\varphi_s$$

where ΔL represents the displacement value of the target mirror (8), $\Delta\varphi_s$ represents the phase difference corresponding to the displacement value, and λ represents a laser wavelength, and n represents a refractivity of air.

4. The interferometric displacement measurement system based on phase modulation of polarized light of micro probe as claimed in claim 1, wherein the driving voltage signal is expressed as:

$$V = V_0 \cos w_c t$$

where V represents the driving voltage signal, $V_0$ represents an amplitude of the driving voltage signal, t represents time, and $w_c$ represents a frequency of the driving voltage signal;

wherein an orthogonal polarization component of the first light component and an orthogonal polarization component of the second light component modulated by the electro-optic phase modulator (2) are expressed as:

$$\varphi_{z(e)} = \frac{2\pi}{\lambda} n_e D_{eo} - \frac{\pi}{\lambda} n_e^3 \gamma_e D_{eo} \frac{V}{d}$$

$$\varphi_{x(o)} = \frac{2\pi}{\lambda} n_o D_{eo} - \frac{\pi}{\lambda} n_o^3 \gamma_o D_{eo} \frac{V}{d}$$

where $\varphi_{x(o)}$ represents the orthogonal polarization component of the first light component, $\varphi_{z(e)}$ represents the orthogonal polarization component of the second light component, $n_e$ represents a refractivity of an e-light component under natural birefringence of a crystal, $n_o$ represents a refractivity of an o-light component under the natural birefringence of the crystal, $D_{eo}$ represents a length of the crystal along an optical axis, d represents a height of the crystal along a direction of an electric field, $\gamma_e$ and $\gamma_o$ represent an electro-optical coefficient of e-light and an electro-optical coefficient of o-light respectively, and λ represents a laser wavelength.

5. The interferometric displacement measurement system based on phase modulation of polarized light of micro probe as claimed in claim 1, wherein an angle between a connector of the polarization-maintaining fiber jumper (10) and a slow axis of a polarization-maintaining fiber is 45 degrees.

6. The interferometric displacement measurement system based on phase modulation of polarized light of micro probe as claimed in claim 1, further comprising: a gradient index collimating lens (4) disposed at an input end of the polarization beam splitter (5).

7. The interferometric displacement measurement system based on phase modulation of polarized light of micro probe as claimed in claim 6, wherein the electro-optical phase modulator (2), the polarization-maintaining fiber circulator (3), the gradient index collimating lens (4), the polarization beam splitter (5), the fiber polarization element (6), and the photodetector (7) are connected to each other through polarization-maintaining fibers.

8. The interferometric displacement measurement system based on phase modulation of polarized light of micro probe as claimed in claim 6, wherein the gradient index collimating lens (4) and the polarization beam splitter (5) form a micro probe configured for displacement interferometric sensing.

9. An interferometric displacement measurement method based on phase modulation of polarized light of micro probe, wherein the interferometric displacement measurement method is applied to the interferometric displacement measurement system based on phase modulation of polarized light of micro probe as claimed in claim 1, and the interferometric displacement measurement method comprises:

generating, by the driver (13), sinusoidal voltage signals; and transmitting, by the driver (13), the sinusoidal voltage signals to the electro-optic phase modulator (2) and the signal demodulator (11), respectively;

outputting, by the semiconductor laser (1), the polarized light beam to the electro-optic phase modulator (2) through the polarization-maintaining fiber optic jumper (10); and processing the polarized light beam by the electro-optic phase modulator (2) to generate the adjusted light beam having the first light component and the second light component;

transmitting, by the polarization-maintaining fiber circulator (3), the first light component and the second light component to the polarization beam splitter (5) to obtain the measurement light beam and the reference light beam; wherein the reference light beam is obtained through reflecting the adjusted light beam by a built-in reflection surface of the polarization beam splitter (5), and the measurement light beam is obtained through reflecting the adjusted light beam by the target mirror (8);

transmitting, by the polarization beam splitter (5), the measurement light beam and the reference light beam to the third port of the polarization-maintaining fiber circulator (3); transmitting, by the polarization-maintaining fiber circulator (3), the reference light beam and the measurement light beam to the fiber optic polarization element (6); processing, by the fiber optic polarization element (6), the measurement light beam and the reference light beam to generate the interference light signal; and receiving the interference light signal by the photodetector (7); and processing, by the photodetector (7), the interference light signal to generate the interference electrical signal; processing, by the signal demodulator (11), the interference electrical signal to obtain a phase difference; and obtaining, by the signal demodulator (11), the displacement value of the target mirror (8) based on a linear relationship between the phase difference and the displacement value of the target mirror (8).

* * * * *